(12) United States Patent
Monteagudo

(10) Patent No.: US 6,585,277 B1
(45) Date of Patent: Jul. 1, 2003

(54) HAND POWERED CART

(76) Inventor: Manuel Monteagudo, 11045 SW. 52nd Dr., Miami, FL (US) 33165

( * ) Notice: Subject to any disclaimer, the term of this patent is extended or adjusted under 35 U.S.C. 154(b) by 0 days.

(21) Appl. No.: 10/032,024

(22) Filed: Dec. 21, 2001

(51) Int. Cl.[7] ................................................ B62M 1/14
(52) U.S. Cl. ........................ 280/244; 280/246; 280/253
(58) Field of Search ................................. 280/244, 246, 280/252, 253, 242.1, 243

(56) References Cited

U.S. PATENT DOCUMENTS

| | | | | |
|---|---|---|---|---|
| 4,632,414 A | * | 12/1986 | Ellefson | 280/246 |
| 4,639,007 A | * | 1/1987 | Lawrence | 280/234 |
| 4,705,284 A | * | 11/1987 | Stout | 280/242 |
| 4,749,207 A | * | 6/1988 | Oh | 280/247 |
| 4,941,673 A | * | 7/1990 | Bennett | 280/112.2 |
| 5,280,936 A | * | 1/1994 | Schmidlin | 280/234 |
| 5,833,256 A | * | 11/1998 | Gilmore | 280/224 |
| 6,325,398 B1 | * | 12/2001 | Banzi | 280/250.1 |
| 6,328,325 B1 | * | 12/2001 | Greenwood | 280/231 |

* cited by examiner

*Primary Examiner*—Lesley D. Morris
*Assistant Examiner*—Tony Winner
(74) *Attorney, Agent, or Firm*—Akerman Senterfitt; Michael C. Cesarano (57) ABSTRACT

A hand powered cart uses a drive mechanism having a power lever operated by the operator's hands and arms, and is steerable by the operator's feet. The drive mechanism includes a closed drive chain that is given forward motion by a one-way freewheeling power sprocket, and that loops around idler sprockets, a drive sprocket, and a take-up sprocket. The power sprocket is attached to a reciprocating power lever, and moves back and forth. When moving forward, the power sprocket drives the drive chain. When moving backwards, the power sprocket freewheels without disengaging from the chain. The take-up sprocket is forced against the chain by a spring, and maintains the chain within a predetermined range of tension.

3 Claims, 6 Drawing Sheets

HAND POWERED CART

BACKGROUND OF INVENTION

Human-powered vehicles provide a means of self-propelled transportation that is an alternative to the relatively slow process of walking. Leg-powered vehicles and carts have long provided transportation as an alternative to motorized vehicles, and are particularly popular with children and adults who have the physical ability and motivation to use them.

Early bicycles employed foot pedals directly attached at or near the center of a drive wheel to provide power to the drive wheel and propel the vehicle. That configuration, however, was unwieldy because the drive wheel had to fit between the operator's legs and was therefore limited in radius, and the permanently attached pedals were always in motion whenever the drive wheel was turning. Because of these limitations, this vehicle could cover only a limited amount of ground per revolution of the pedals/drive wheel, and the operator could not rest his or her legs while the vehicle was in motion. The problem of having a single rotation of the pedals cause only a single rotation of the drive wheel was eventually overcome by the development of a sprocket and drive chain system in which two sprockets could be connected by a drive chain or belt, whereby one sprocket would be attached to the pedals and a second sprocket would be attached to the drive wheel In this configuration, the size of the sprockets could be varied for different vehicles such that the ratio of drive wheel rotations per single rotation of the pedals became a function of the relative sizes (or the number of teeth on the sprocket) of each of the sprockets. Because different sizes of sprockets for the pedals and drive wheel permitted a range of speed and power, and it became possible to design and build human-powered vehicles that could operate efficiently over a wide range of surface conditions.

Along with sprocket and drive chain systems came the development of sprocket assemblies that would provide rotational torque to a drive wheel when rotated in one direction, but that would freewheel or remain stationary independently of the rotation of the drive wheel when torque was not being applied to the drive wheel. This development of such a one-way freewheeling sprocket made it possible for the human operator's legs to remain stationary while the vehicle was in a coasting motion.

Modern bicycles employ all of these developments, and have been made even more versatile through the employment of a number of sprockets of different sizes both on the drive wheel and on the pedals. By urging or forcing the chain connecting the pedals to the drive sprocket to jump from one sized sprocket to another, it is possible for a single vehicle to exhibit a wide range of speed and power settings, simply by moving the drive chain between sprockets of different sizes at the pedals, or the drive wheel, or both. When this is done, however, the total length of the drive path along which the chain or belt must travel will become shorter or longer, depending upon the specific sprocket-to-sprocket configuration.

In order to accommodate the drive chain, which has a fixed length, throughout the variable length of the drive path, a slack take-up device must be employed. In one such device, two idler sprockets closely positioned to one another may be affixed to a partially rotatable frame which is attached to the external structure at a pivot point located somewhere on the idler frame. A portion of the drive chain between the driving wheel sprocket and the pedal sprocket is threaded around and between the two idler sprockets such that the chain passes above and around the circumference of the uppermost idler sprocket, then passes between the two sprockets, and finally passes below and around the circumference of the lower idler sprocket, leaving the device in the same general direction of travel as it had when approaching the device. A spring is used to rotate and bias the idler frame toward a configuration in which the chain traverses a maximum length path through the slack take-up device.

In general, in any device having a variable length drive path, the drive chain must be long enough to traverse the maximum anticipated length of the drive path. Obviously, when the drive path is less than the maximum length, there most be a means for taking up slack in the drive chain. Although such slack take-up devices are common on multiple-gear bicycles, the have not found significant application in other human-powered devices. Accordingly, it is an object of this invention to use a slack take-up device to compensate for a constantly varying length of drive path using a constant length drive chain in a hand powered cart. It is another object of this invention to provide a hand powered cart for vehicular transportation, exercise, and recreation.

SUMMARY OF THE INVENTION

With few exceptions, however, human powered vehicles have been designed for operation through the use of leg power to push pedals. The present invention, however, is a four-wheeled steerable cart upon which a person can sit, that can be guided by moving the front two wheels with the feet, and that is powered by a back-and-forth pumping action of the arms.

In its most basic embodiment, the cart consists of a chassis or frame upon which is mounted a seat. Two rear driving wheels are attached to an axle at the rear of the chassis, and are powered by a chain drive that provides rotational torque to a sprocket attached to the rear axle.

Two front wheels are attached to an axle at the forward end of the cart, and the direction of movement of the cart may be determined by pushing with a left or right foot upon the axle on one side or the other of the cart, thereby causing the front wheels to turn. Although other configurations may be used for steering the cart, the preferred embodiment is one in which the front axle is attached to the chassis at a single pivot point, and steering is accomplished by using the feet while the motive power for the cart is furnished by hand and arm pumping.

A power lever with handgrips on either side extends through the chassis, having a lower end in the vicinity of the drive chain which is located below the chassis, and an upper end that is approximately at shoulder level of a person seated on the cart. The power lever has a lynchpin rotatably connecting it to the chassis at or near the point that the lever extends through the chassis. The handgrips are situated such that the hands and arms are in position to provide a back and forth movement of the power lever above the chassis.

The lower extremity of the power lever has a one-way freewheeling sprocket attached to it to engage the drive chain. The drive chain forms a continuous loop, and is held in position by two idler sprockets attached to the chassis by axles, and by a slack take-up device which itself includes at least one additional idler sprockets. The drive chain also engages the drive sprocket on the rear drive wheel or axle. Power is provided to the drive chain by the one-way freewheeling sprocket attached to the lower end of the drive lever.

In operation, when the operator pulls the upper part of the power lever toward the rear of the cart, the sprocket at the lower end of the lever engages the drive chain and pulls it in a forward direction. As the chain pulls forward, it produces rotational torque upon the sprocket attached to the drive wheels, causing them to turn in the direction to move the cart forward. When upper half of the lever reaches its rearmost position, the operator will reset the lever by reversing its direction and pushing it back toward the front of the vehicle. Since the sprocket at the lower end of the lever freewheels in the reverse direction, it is now being rotated back against the drive chain, and will freewheel along the chain without causing significant backward forces to be exerted upon the drive chain. During the reset motion, the drive chain beneath the chassis will continue to be in motion, and, in the preferred embodiment, will remain in motion so long as the rear wheels are turning. In alternative embodiments, a one-way freewheeling sprocket may also be used on the rear axle, and in this configuration the car may be in motion although the drive chain may be stationary.

When the power lever has been reset, the operator may again apply a power stroke by pulling the lever toward the rear of the cart, giving the drive chain additional forward impetus, and increasing or maintaining the speed of rotation of the rear drive wheels.

The power sprocket at the lower end of the lever follows a circular arc whose radius is the distance between the sprocket and the lynchpin of the lever. The sprocket engages the drive chain at a point between two idler sprockets, and engagement of the sprocket teeth into cavities in the drive chain is ensured by maintaining sufficient tension on the drive chain to hold it in position where the power sprocket forces it to be displaced from a line which forms a tangent with each of the idler sprockets. The arcing motion of the power lever causes the drive chain to be displaced from the tangent line by varying amounts, depending upon the position of the lever at any given time. Because the motion of the power lever causes the length of the drive path between the idler sprockets to vary, the slack take-up device compensates by displacing the drive chain from its shortest path by forcing a take-up sprocket against the drive chain and maintaining that force with a spring. In this manner, the tension of the drive chain may be maintained within a reasonable range while power is applied to the rear wheels during each power stroke.

DESCRIPTION OF THE PREFERRED EMBODIMENTS

Figure 1:
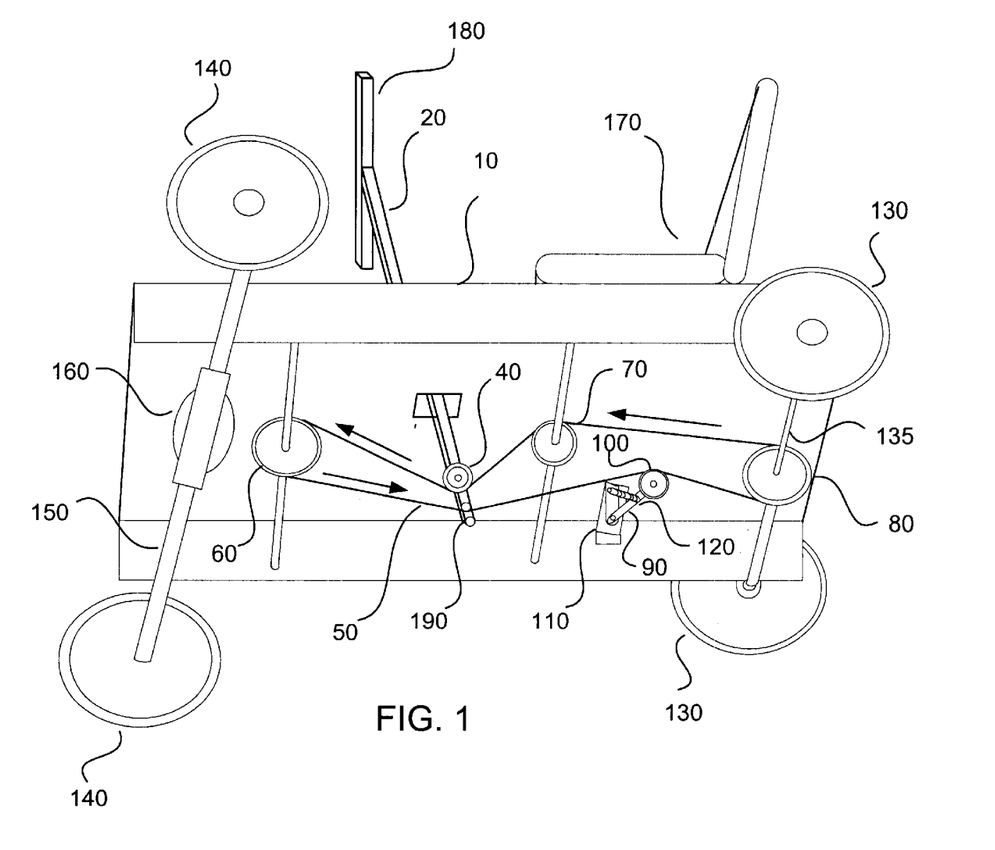
FIG. 1 depicts a perspective view of the drive path from the underside of the hand powered cart.

FIG. 1 shows the drive path as viewed from the underside of the cart. A chassis 10 supports a seat 130 and a power lever 20. Power lever 20 has a crossbar 180 that is used for providing power to the drive mechanism. Rear wheels 130 are attached to axle 135 and to drive sprocket 80. The rear axle may be rotatably secured to the chassis 10 in any conventional manner. Front wheels 140 are attached to front steerable axle 150 which, in turn, is attached to the chassis through steering pinion 160. The front wheels 140 are turned through the action of the steering axle 150, and in the embodiment of FIG. 1, the steering axle has a single attachment point to the chassis at steering pinion 160. The driver's feet are placed on steering axle 150 on either side of the chassis, and steering is accomplished by the driver pushing one foot, and the steering axle, in the desired direction of turn.

The drive mechanism is a single drive chain 50 that is given forward impetus whenever power lever sprocket 40 at the lower end of power lever 20 is forced forward by the operator's pulling the power lever crossbar 180 rearward with the operator's arms. A pin 130 (not shown in FIG. 1) extending laterally through the power lever provides the fulcrum for power lever 20. Lever sprocket 40 is a one-way freewheeling sprocket that is rotatable on its axis in only one angular direction. As depicted in FIG. 1, lever sprocket 40 can rotate only clockwise. As lever crossbar 180 is pulled rearward by the operator, lever sprocket 40 moves forward without rotating on its own axis, thereby pulling drive chain 50 forward, and causing drive sprocket 80 and rear wheels 130 to rotate counterclockwise, driving the cart forward. When power lever 20 completes the power stroke it is returned to its starting position by the operator's moving the power crossbar forward. This causes lever sprocket 40 to move rearward in relation to the drive chain 50, and to freewheel in a clockwise direction. By freewheeling, lever sprocket 40 is moved backwards on drive chain 50 without becoming disengaged from the drive chain or retarding the forward motion of the drive chain.

Figure 2:
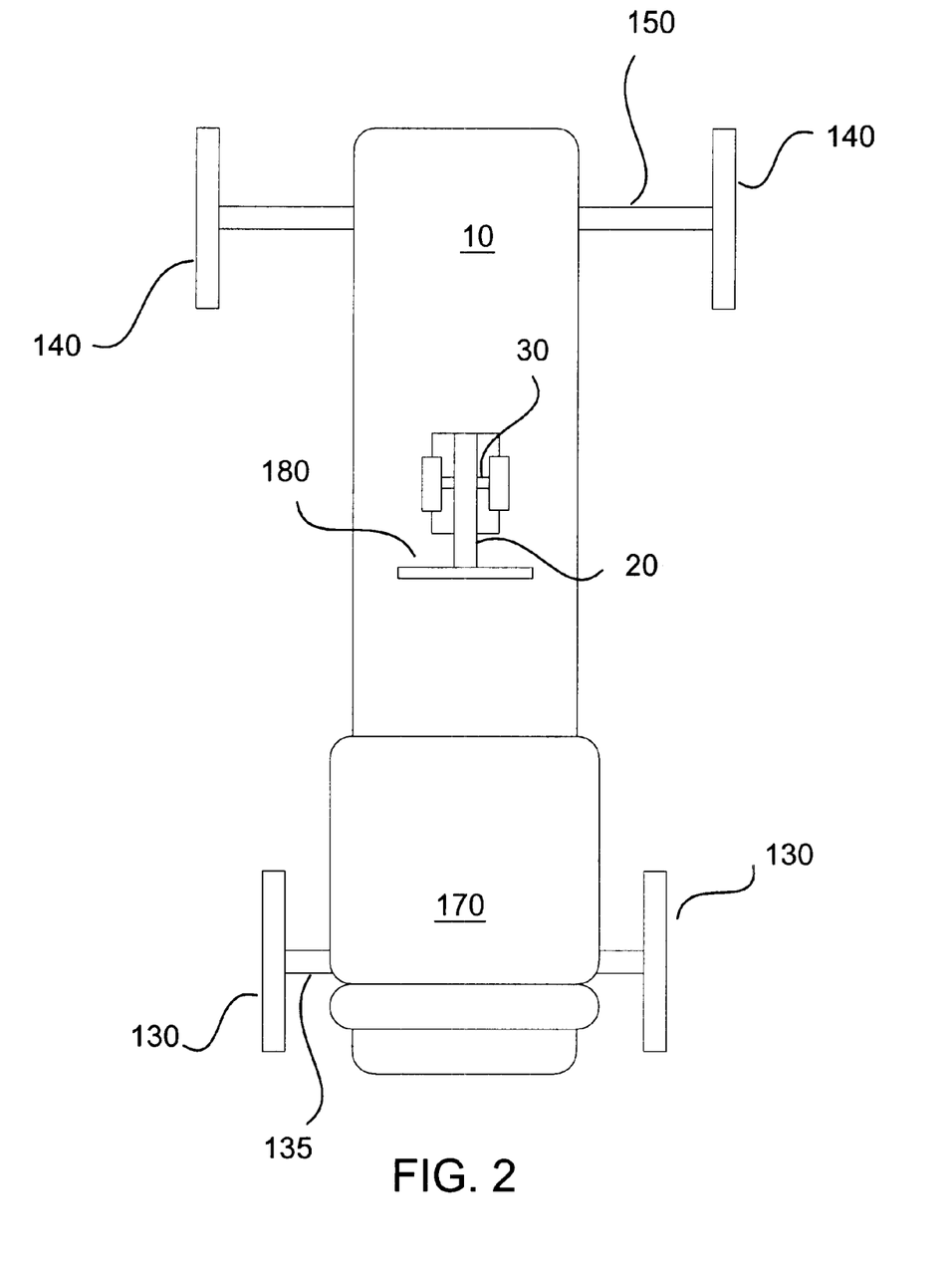
FIG. 2 depicts a plan view of the cart.

FIG. 2 is a plan view of the cart. A seat 170 is provided for the operator. The operator's feet rest on steering axle 150, on either side of the chassis, and the cart is steered by the operator's applying opposite forces to either side of the steering axle. The power lever 20 extends through the chassis through an opening therein, and power lever pin 30, which is located at approximately chassis level, provides a fulcrum for the power lever. Power lever crossbar 180 is placed where it 127 can be conveniently pumped by the operator's arms. Seat 170 can be placed on a track so as to be adjustable for operators having different leg and arm lengths.

Figure 3:
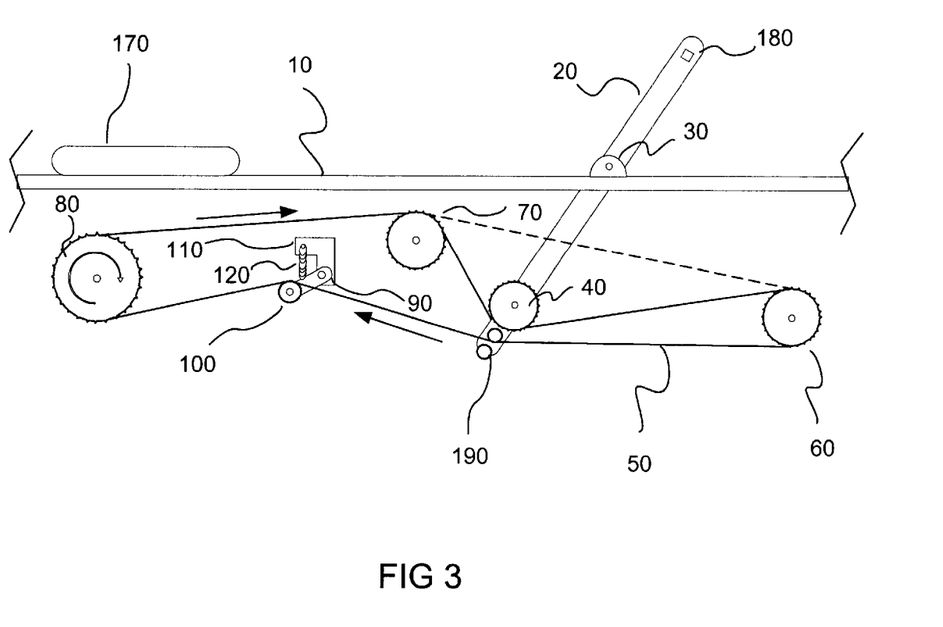
FIG. 3 depicts a front elevational view of the drive chain mechanism below the chassis with the power lever at the beginning of a power stroke.
Figure 4:
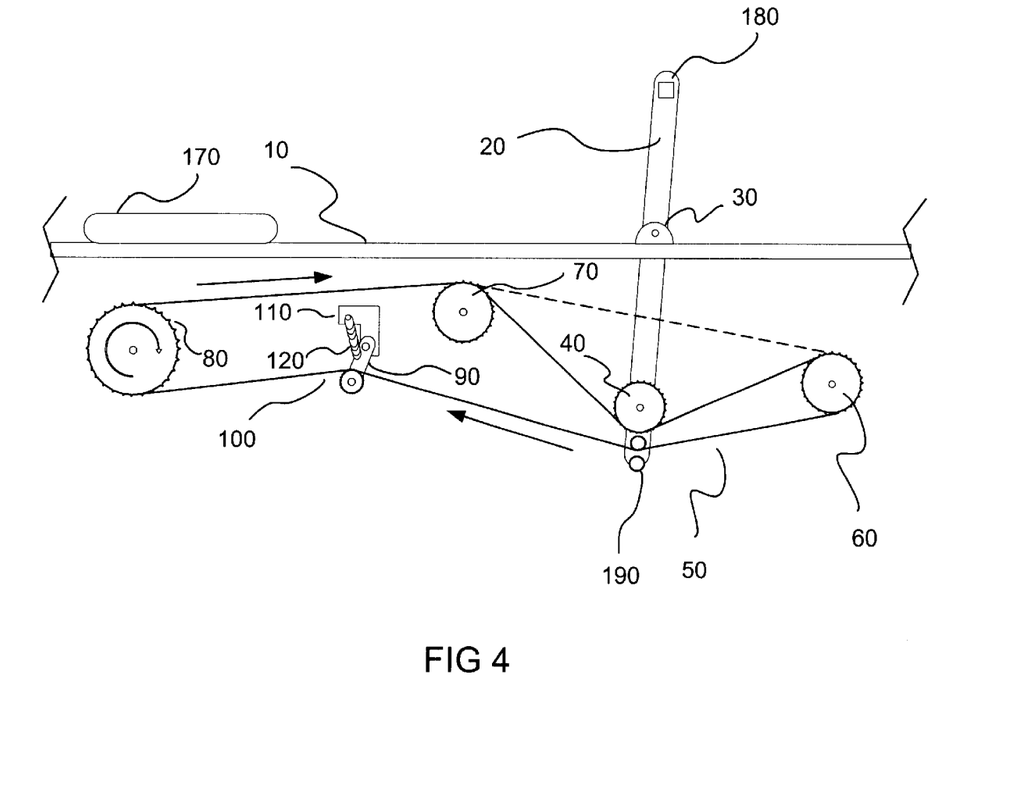
FIG. 4 depicts a front elevational view of the drive chain mechanism below the chassis with the power lever at the mid range of a power stroke.
Figure 5:
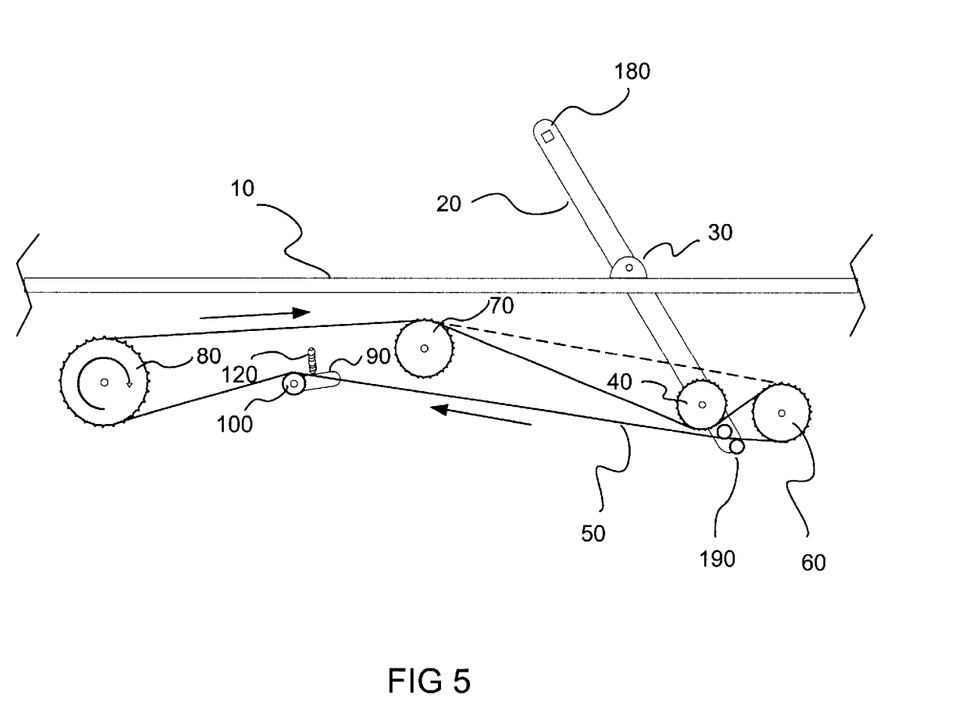
FIG. 5 depicts a front elevational view of the drive chain mechanism below the chassis with the power lever at the end of a power stroke.

FIGS. 3–5 provide details of the drive path. In FIG. 3 the drive mechanism is shown at the beginning of a power stroke. The drive path is located below the chassis 10, through which power lever 20 extends and has a pivot point 30 at or near the chassis. Lever sprocket 40 is located at the lower end of power lever 20, and engages drive chain 50 at a point between upper idler sprocket 70 and forward idler sprocket 60. A chain, take-up assembly has take-up sprocket 100 attached to take-up finger 90. Take-up finer 90 isrotatably attached to take-up bracket 110, which is secured to the chassis 10. One end of take-up spring 120 is attached to take-up finer 90 and the other end is attached to a point on take-up bracket 110 or to the chassis.

As shown in FIG. 3, lever 20 is at the beginning of a power stroke, and lever sprocket 40 is held against drive chain 50 with sufficient tension to cause the drive chain to be displaced from an imaginary tangent line drawn between upper idler sprocket 70 and forward idler sprocket 60. As displaced, the tension on drive chain 50 will hold the chain against lever sprocket 40 with sufficient force to permit the gear teeth of the sprocket to engage cavities in the drive chain such that, when force is placed upon lever 20, the force will be applied to the drive chain and will impart forward movement to it. The drive chain will be pulled across upper idler sprocket 70 and will impart rotational torque to the drive sprocket 80 attached to the drive wheels 130, causing the drive wheels to rotate and move the cart forward.

In FIG. 4, power lever 20 is at a midpoint in the power stroke. As is shown in FIG. 4, this position of power lever 20 causes a maximum displacement of the drive chain from the tangent line between upper idler sprocket 70 and forward idler sprocket 60. As maximum displacement is reached, take-up sprocket 100 may be seen to rotate counterclockwise to compensate for the maximum displacement of drive chain 50 between the upper and forward idler sprockets. Rotation of the take-up sprocket 100 is resisted by take-up spring 120, which has one end attached to the take-up finger 90 and the other attached to take-up bracket 110 (not shown) or some related support structure. This results in a more-or-less constant tension being maintained upon drive chain 50.

FIG. 5 shows power lever 20 at the far end of the power stroke. Take-up sprocket 100 has now returned to a position in which it provides a maximum length for the drive path. Although each power stroke and reset stroke of power lever 20 produces a maximum displacement of drive chain 50 from tangent line, take-up sprocket 100 and, take-up finger 90 will rotated first counterclockwise, and then clockwise to compensate for the varying length of the drive path caused by the reciprocating action of the power lever 20.

As is shown in FIGS. 3–5, power lever 20 has two pegs 190 located below power lever sprocket 40 to hold the return portion of drive chain 50 below and away from interference with power lever sprocket 40. Because the drive mechanism must operate within a narrow space between the chassis and the ground, it is important that the entire drive path be maintained within a relatively tight vertical configuration. Power lever pegs 190 hold the drive chain 50 away from power lever sprocket 40 during movement of the power lever, and permit idler sprockets 70 and 60 to be located with sufficient vertical ground clearance to ensure the proper operation of the drive mechanism.

Figure 6A:
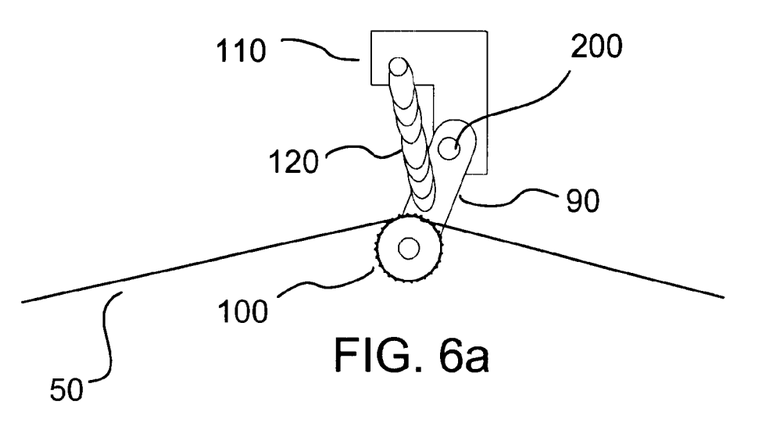
FIGS. 6a and 6b depict detail of the take-up mechanism, FIG. 6a representing the maximum displacement of the take-up sprocket, and FIG. 6b representing a minimum displacement of the take-up sprocket.
Figure 6B:
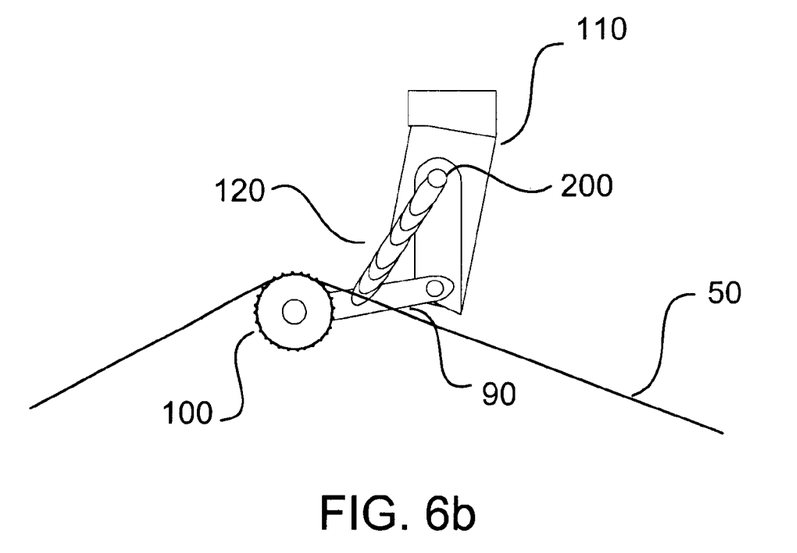

FIGS. 6a and 6b depict detailed embodiments of the take-up finger 90, sprocket 100, spring 120 and bracket 110. In FIG. 6a, an inverted "L" shaped bracket is shown in elevational view. The take-up spring 120 is attached at one end to the horizontally extending portion of the "L" and, at the other end, to take-up finger 90. Take-up finger 90 is rotatably attached to bracket 110 at pin 200, which permits the finger and take-up sprocket 100 to rotate counterclockwise when tension is applied to drive chain 50, and to be returned by spring 120 to their original positions when tension on drive chain 50 is eased. Bracket 110 may be rigidly attached to the chassis by being extending to a side panel of the chassis, or through attachment with a second bracket or spacer (not shown) to an overhead part of the chassis. FIG. 6b is a perspective view of take-up bracket 110 where the bracket is extended horizontally to a side panel of the chassis (also shown in FIG. 1). Take-up spring 120 is again attached to take-up finger 90 so as to bias finger 90 toward clockwise rotation when tension on drive chain 50 is eased.

Combinations of these take-up assemblies, and other modifications of mechanisms known in the art may be used, and will remain within the scope of this invention. For example, a one way freewheeling sprocket could be substituted for the sprocket on the drive sprocket, thus permitting the cart to remain in motion, or coast, while the drive chain is stationary with respect to the chassis, and such modification would be within the parameters of this invention. The instant invention has been shown and described herein in what is considered to be the most practical and preferred embodiment. It is recognized, however, that departures may be made here from while remaining within the scope of the invention and that obvious modifications will occur to a person skilled in the art. Accordingly, the embodiments and descriptions shown and provided herein are illustrative of the concepts for a hand powered cart, and should not be taken as limiting the scope and spirit of the invention.

What is claimed is:

1. A hand-powered cart comprising:

two front wheels connected to a front axle, two rear wheels connected to a rear axle, a chassis having a front end and a rear end, a seat, and a power, lever;

said front axle being pivotably connected to said chassis near said front end, said rear axle being connected to said chassis near said rear end, said power lever extending through an opening in said chassis and having a pin extending laterally through an intermediate point in said power lever and being attached to said chassis at either side of said opening such that said power lever may be reciprocatingly rotated about said pin along the longitudinal axis of said chassis;

said power lever being operated by the hand and arm movement of an operator;

a drive mechanism below said chassis, said drive mechanism further comprising a drive chain, a plurality of sprockets, and a take-up assembly, said plurality of sprockets comprising at least a drive sprocket, a power sprocket, and a plurality of idler sprockets;

said drive chain having spaced cavities for meshing with the teeth of each sprocket in said plurality of sprockets and being in driving engagement therewith, said power sprocket being a one-way freewheeling sprocket attached to the lower portion of said power lever, said power sprocket applying force to said drive chain when said lower portion of said power lever is moved in a first direction toward said front end of said chassis, and freewheeling along said drive chain without applying force when said power lever is moved in a second direction that is opposite to said first direction, said drive sprocket being attached to said rear axle and imparting rotational motion to said rear wheels when said drive sprocket is caused to rotate by the motion of said drive chain, at least one of said idler sprockets being located in front of said power sprocket and at least one of said idler sprockets being located behind said power sprocket such that said drive chain is suspended between said idler sprockets and is maintained in a position to be engaged by said power sprocket, said take-up assembly comprising at least one take-up sprocket, a take-up finger, a spring, and a take-up bracket, said at least one take-up sprocket being rotatably attached to said take-up finger and engaging said drive chain, said take-up finger being rotatably attached to said take-up bracket, said spring having a first end attached to said take-up bracket and a second end attached to said take-up finger, said take-up finger being biased against rotational movement away from said take-up bracket such that, as tension in said drive chain increases, said at least one take-up sprocket and said take-up finger are forced away from said take-up bracket and, as tension in said drive chain decreases, said spring forces said at least one take-up sprocket and said take-up finger closer to said take-up bracket, said take-up bracket being rigidly connected to said chassis such that said take-up assembly maintains tension on said drive chain within a predetermined range, said drive mechanism imparting single direction movement to said drive chain when said power lever is reciprocatingly operated by said operator, said hand-powered cart being steerable by said operator's feet causing said front axle to pivot about said pivotable connection between said front axle and said chassis.

2. A drive assembly for a hand powered cart having at least four wheels at least two of which are drive wheels, a seat, and a power lever, said drive assembly comprising:

a drive chain, a drive sprocket attached to said at least two drive wheels, a power sprocket attached near the lower end of said power lever, said power sprocket being a one-way freewheeling sprocket, a forward idler sprocket, an upper idler sprocket, a take-up sprocket, said take-up sprocket being rotatably attached to a take-up finger, said take-up finger being movably attached to a take-up bracket, a spring attached to said take-up finger and said take-up bracket, said spring forcing said take-up sprocket toward said drive chain, said drive chain being engaged with said power sprocket, said drive sprocket, said forward idler sprocket, said upper idler sprocket, and said take up sprocket, said drive chain being forced in a forward direction when said power sprocket has forward motion, said drive chain remaining in forward motion when said power sprocket is freewheeling and moving in a rearward motion relative to said drive chain, said take-up sprocket being forced against said drive chain to maintain a predetermined range of tension upon said drive chain, said take-up sprocket and said take-up finger moving relative to said take-up bracket such that said drive chain tension remains within a predetermined range during the forward and rearward movement of said power sprocket, such that said drive wheels are rotated in a forward direction when said power sprocket moves in a forward direction and said drive wheels continue to rotate from their own inertia when said power sprocket moves in a rearward direction.

3. The drive assembly of claim 2, further comprising said power lever and said power sprocket engaging in reciprocating motion when said power lever is moved by an operator operating said cart.

* * * * *